United States Patent [19]

Lofgren et al.

[11] Patent Number: 4,626,995
[45] Date of Patent: Dec. 2, 1986

[54] APPARATUS AND METHOD FOR OPTICAL GUIDANCE SYSTEM FOR AUTOMATIC GUIDED VEHICLE

[75] Inventors: Gunnar K. Lofgren, Charlotte, N.C.; Göran P. R. Netzler, Frillesås, Sweden

[73] Assignee: NDC Technologies, Inc., Charlotte, N.C.

[21] Appl. No.: 593,477

[22] Filed: Mar. 26, 1984

[51] Int. Cl.⁴ .................. G06F 15/20; B62D 15/00
[52] U.S. Cl. .................................. 364/424; 364/436; 364/449; 180/169
[58] Field of Search .............. 364/424, 436, 514; 180/167–169, 449, 460; 356/4, 11, 28, 3, 1, 138, 143, 147, 148, 150, 155

[56] References Cited

U.S. PATENT DOCUMENTS

| | | | |
|---|---|---|---|
| 3,892,483 | 7/1975 | Säufferer | 180/169 |
| 4,114,711 | 9/1978 | Wilkins | 180/169 |
| 4,219,052 | 8/1980 | Richter | 180/169 |
| 4,257,703 | 3/1981 | Goodrich | 364/565 |
| 4,309,758 | 1/1982 | Halsall et al. | 364/424 |
| 4,328,545 | 5/1982 | Halsall et al. | 364/424 |
| 4,482,960 | 11/1984 | Pryor | 364/424 |

OTHER PUBLICATIONS

"Selcom 800", brochure.
"Selspot II, The New Turnkey System for Motion Analysis", brochure.

*Primary Examiner*—Parshotam S. Lall
*Assistant Examiner*—Thomas G. Black
*Attorney, Agent, or Firm*—W. Thad Adams, III

[57] ABSTRACT

An optical guidance system for remotely controlled, self-propelled vehicles in which a single light source is used as an aiming point by the vehicle. The light source is detected by a camera lens and the vehicle is maneuvered according to the position of the light within the field of view of the lens. A computer is provided to determine the cartesian coordinates of the light source and calculate the position of the vehicle relative to the light source. The light source also transmits optically coded information for controlling the vehicle relative to the position of other vehicles, the condition of the vehicle path or other related information.

2 Claims, 14 Drawing Figures

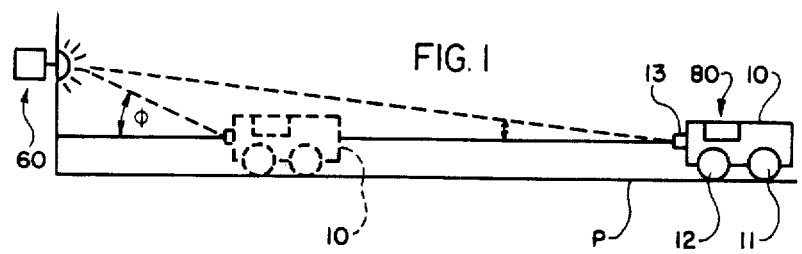
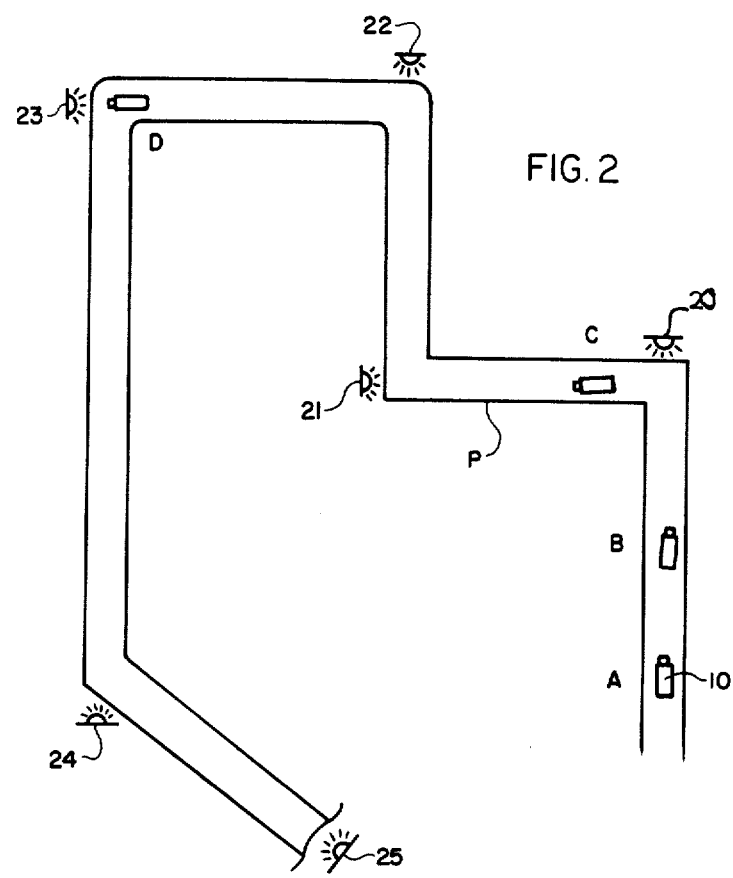

APPARATUS AND METHOD FOR OPTICAL GUIDANCE SYSTEM FOR AUTOMATIC GUIDED VEHICLE

TECHNICAL FIELD AND BACKGROUND OF THE INVENTION

This invention relates to an optical guidance system for remotely controlled, self-propelled vehicles. Vehicles of the type described in this application have many different uses such as for carrying loads, pallets and fixtures, particularly in a manufacturing or warehouse facility.

However, vehicles of the general type described in this application can have other uses such as conveyors in automobile assembly plants and as farm equipment, lawn mowers, sweepers and other types of utility vehicles. Prior art vehicles of this type are generally operated on a fixed track or follow a wire embedded in the floor. The invention described in this application is intended to provide greater flexibility and lower cost in the use of such vehicles, thereby expanding their range of use.

The main problem with known types of automatically guided vehicles is the necessity of using a fixed track or a wire guidance system. For many application, these types are ideal. However, these systems must be installed on or in the floor and, once installed, are not readily moveable. Therefore, such systems are generally suitable where it is known that the vehicle will operate only on a certain pattern and that there will be no need to vary the route that the vehicle will take. In environments where it is necessary to vary the path taken by a vehicle from time to time, manually operated vehicles have been required.

Systems which are referred to as "optical guidance systems" are known in the art. One type of optical system relies on an optical effect called "moiré" which uses closely spaced-apart gratings to produce a pattern which is visible to, for example, the pilot of an airplane. The pilot responds to the pattern created in the gratings to keep the airplane on a center line until a given point is reached. This type of technology should be carefully distinguished from that disclosed in this application since it is not automatic in any sense and simply provides a visual reference point and certain steering and control information to an individual who then responds accordingly.

Another type of guidance system is disclosed in the Burgener et al. U.S. Pat. No. 4,236,255. Burgener discloses a moveable rack entry vehicle which rolls along a railroad-like track and stores and retrieves goods from a plurality of storage areas. The particular storage area to be accessed by the vehicle is determined by an universal asynchronous receiver-transmitter, one of which is located on the vehicle and one of which is located at a reference station positioned at one end of the track on which the vehicle rides. Information identifying to the vehicle the area to be accessed is transmitted to the vehicle by optical communication in serial form.

Yet another type of guidance system is disclosed in U.S. Pat. Nos. 4,309,758 and 4,328,545, both to Halsall et al. These patents disclose an unmanned vehicle which is guided toward a pre-determined destination by geometrical computation of light signals received by at least three omni-directional detectors positioned on the vehicle. An on-board computer performs trigonometric computations based upon information fed to it by the three light signal detectors.

In the present invention which is described below in several embodiments, a single light source is used as an aiming point by the vehicle. The light source is detected by a camera lens and the vehicle is maneuvered according to the position of the light within the field of view of the lens. Since no wires or tracks need be attached to the floor, the light need only be moved to a desired location and the controlling computer re-programmed accordingly to make the vehicle follow any pre-determined path. By arranging a plurality of lights in serial form as desired, the vehicle can be programmed to follow a circuitous, easily changeable path.

SUMMARY OF THE INVENTION

Therefore, it is an object of the present invention to provide an optical guidance system for a freely maneuverable vehicle which provides azimuth and direction guidance to the vehicle by means of a light source.

It is another object of the present invention to provide an optical guidance system for a freely maneuverable vehicle wheren the vehicle is guided in its direction by a light source and the distance to the light source is determined by means of coded signals on the vehicle path.

It is another object of the present invention to provide an optically guided, freely maneuverable vehicle wherein communication to and from the vehicle by light source occurs.

It is another object of the present invention to provide an optical guidance system for a freely maneuverable vehicle wherein a plurality of light sources forms a vehicle path.

These and other objects and advantages of the present invention are achieved in the preferred embodiment described below by providing in a vehicle freely maneuverable along a variable predetermined path, navigation means which comprise a light receiving lens mounted on either the vehicle or at a fixed point. A light source is mounted on the other of the lens or the fixed point for sending light energy through the lens. Computing means are provided which receive light energy through the lens and determine cartesian coordinates of the light source and calculate the position of the vehicle relative to the fixed point. The computing means then generates a vehicle control output signal responsive to the coordinates of the light and generates an output signal for maneuvering the vehicle accordingly. Preferably, the light source is mounted at the fixed point and the light receiving point is mounted on the vehicle. Preferably, the light source mounted at the fixed point includes means for transmitting optically coded information for controlling the vehicle relative to the position of other vehicles, the condition of the vehicle path or other related information.

According to one embodiment of the invention, the light source and the light receiving lens are mounted at different horizontal planes. The computing means includes means for sensing the azimuth of the light source relative to the light receiving lens for computing a distance value therebetween.

Alternatively, distance from the vehicle to the fixed point is computed by positioning coded signal means at predetermined points along the path which are adapted to generate a signal concerning the position of the vehicle on the path.

In one embodiment of the invention, a plurality of lights are positioned at predetermined fixed points defining a vehicle path. The computing means comprises memory storage means for containing predetermined vehicle and traffic protocol. The protocol may include information including vehicle speed, directoin, priority of movement, routing or scheduling. Means are provided which sense the position of the vehicle along the path and correlate the actual position of the vehicle with the vehicle and traffic protocol contained within the storage means. Means then send serial messages to the plurality of lights wherein the messages are converted to optical code and transmitted to the lens of the vehicle to command the vehicle to maneuver according to the instructions contained in the message.

A guided vehicle system according to one embodiment of the invention includes navigation means operatively associated with a vehicle and computing the position of the vehicle relative to a plurality of fixed points collectively defining a path. The navigation means include an off-board computer having a vehicle controller having a predetermined vehicle and traffic protocol information, a light source positioned respectively at each of the plurality of fixed points defining the path for receiving the information containing signal from the vehicle controller and emitting a light signal containing such information. A computer on-board the vehicle is provided and includes a light receiving lens for receiving the optical signal from one of the light sources and converting the signal into an X/Y coordinate wherein X represents the bearing of the vehicle relative to the light source and Y represents the azimuth of the vehicle relative to the light source. A central processing unit receives and processes all vehicle information and outputs a vehicle control instruction signal. A power amplifier outputs a vehicle control signal to the vehicle maneuvering apparatus. A detector segregates X-data and Y-data, outputs the Y-data to the central processing unit for azimuth computation and outputs X-data to the central processing unit for vehicle direction computation and to the power amplifier.

BRIEF DESCRIPTION OF THE DRAWINGS

Some of the objects of the invention have been set forth above. Other objects and advantages will appear as the description of the invention proceeds, when taken in conjunction with the following drawings, in which:

FIG. 1 is a side elevational view of an automatically guided vehicle in two positions relative to a light source, illustrating the manner in which distances is determined by azimuth computation;

FIG. 2 is a plan view of a hypothetical path defined by a plurality of lights at fixed points along the path;

DESCRIPTION OF THE PREFERRED EMBODIMENT

Figure 3A:
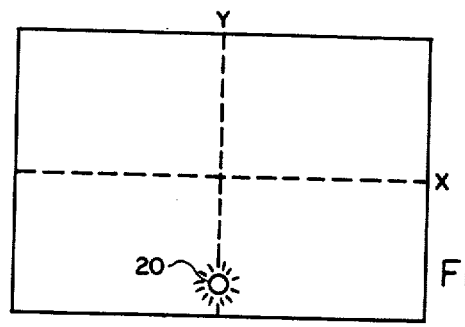
FIGS. 3A-3D illustrate cartesian coordinates computed by the navigation means when the vehicle is located at positions A-D in FIG. 2.
Figure 3B:
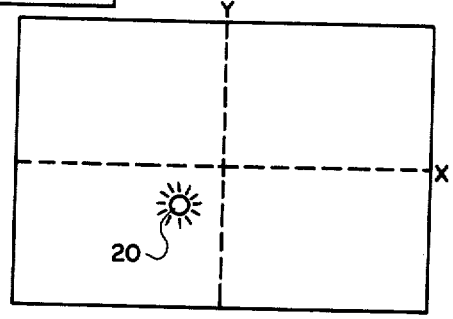
Figure 3C:
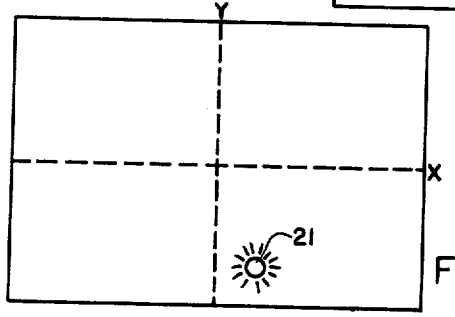

Referring now specifically to the drawings, one embodiment of the invention according to this application is illustrated schematically in FIG. 1. A guided vehicle 10 is shown positioned on a path "P". Vehicle 10 is freely maneuverable by means of a suitable drive system (not shown) by sets of wheels 11 and 12. Mounted on the front of vehicle 10 is a light receiving lens 13. The lens and associated hardware is of a type manufactured by Selective Electronics and known as a Selspot II. The Selspot II is an opto-electronic motion analysis system which utilizes active light sources for determining positions of objects in space. These positions are presented in rectangular (cartesian) coordinates and can be calculated into speed and acceleration values. Prior art uses of Selspot II basically involve the use of active light sources, such as light emitting diodes (LEDs), or lasers which are applied to points on a particular object which is of interest. For example, a plurality of LEDs may be applied to particular parts of an individual's body. By following the light sources on the body as it moves, physical activities such as walking, running or swinging a golf club can be electronically reproduced and then analyzed for efficiency, style, accuracy or any other variable. For purposes of this application, the Selspot II has been generally described as a "lens." However, it will be understood that the term "lens" as used in this application includes a lens itself and a detector which performs the necessary calculations.

Vehicle 10 is controlled both according to its direction and the distance from a light source 20, which, for purposes of this invention, may be an ordinary incandescent light having a relatively narrow beam or, preferably, a light emitting diode (LED) or laser controlled by a computer 60. Still referring to FIG. 1, it will be observed that lens 13 and light 20 are at different horizontal levels. This differential angle creates an angle of incidence between the lens 13 and light 20 which increases as vehicle 10 moves closer to light 20. This angle is sensed by lens 20 and since light 20 is fixed at a point having a known position relative to the path, vehicle 10 knows at all times exactly how far it is from light 20. As is shown in FIG. 1, as vehicle 10 moves closer to light 20, the azimuth increases to a predetermined value. When that predetermined value is reached, a computer 80 which will be described in further detail below, commands the vehicle to perform some predetermined function such as stopping, slowing down, or turning.

The system will be more fully explained now with reference to FIG. 2. In FIG. 2, the path "P" has been defined by positioning several lights at predetermined points along the path. For purposes of description, the lights will be referred to as lights 20, 21, 22,23, 24 and 25. Vehicle 10 proceeds from a predetermined starting point along path "P" towards light 20. At a point on the intersection of the path adjacent light 20, the vehicle is commanded to make a lefthand turn. In doing so, it next picks up light 21 and, by following light 21, arrives at the next intersection when it is commanded to make a righthand turn. At light 22, a lefthand turn is made and at light 23 another lefthand turn is made. At light 24 a shallow lefthand turn is made and light 25 is followed to the end of the path.

FIGS. 3A-3D illustrate the functioning of lens 13 on vehicle 10 at four points on path "P". In FIG. 3A, which corresponds to position A on FIG. 2, the vehicle 10 is at a predetermined distance from the turning point at the intersection adjacent light 20. It is also centered precisely on the path and is correctly tracking light 20. Lens 13 "sees" what is shown in FIG. 3A. The X axis is arbitrarily designated as the direction coordinate and the light being centered on the X axis indicates that the vehicle is steering a proper path directly towards light 20. The X axis is designated at the azimuth or "distance" axis. The position of light 20 on the Y axis substantially below the X axis indicates that the angle of incidence of lens 13 and light 20 is relatively shallow at point A.

At point B (FIG. 3B) vehicle 10 has moved closer to light 20. Therefore, the representation on the axis of light 20 places it closer to the X axis. The position of light 20 to the left of the Y axis indicates that vehicle 10 has sterred somewhat to the right of the center line of the path. The computing means will therefore signal a slight correction so that vehicle 10 resumes its direction of travel towards light 20.

At position C in FIG. 2, vehicle 10 has made a lefthand turn and is proceeding along the path toward light 21. It has steered slightly to the left of the path center line. This position of vehicle 10 at point C is shown representationally at FIG. 3C.

Figure 3D:
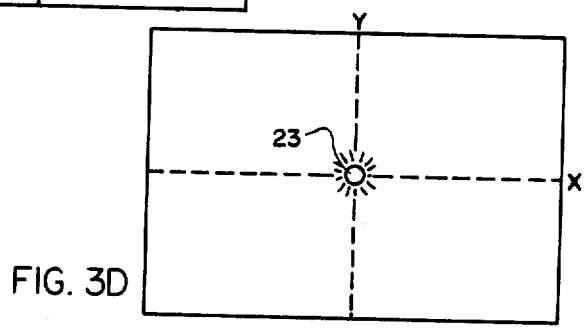

At position D vehicle 10 is shown precisely at the center line of the path at the exact point where it will be commanded to make a lefthand turn. This situation is illustrated in FIG. 3D by the light 20 being precisely centered at the intersection of the Y axis and the X axis. Accordingly, a vehicle may be sterred along any desired path by providing it with the means to properly determine its direction and distance from any fixed point. Furthermore, the path can be easily changed merely by moving the lights and reprogramming the vehicle's computer to take into account the position of the lights.

Figure 4:
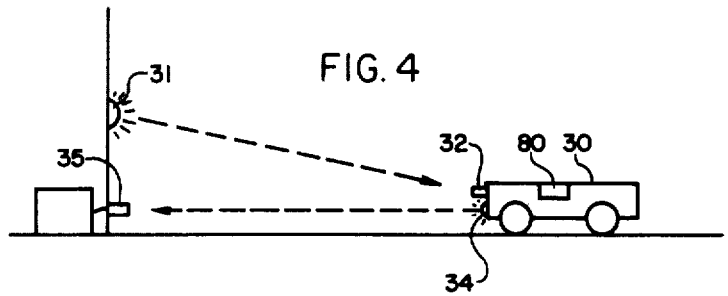
FIG. 4 is a side elevational view of a vehicle according to one embodiment of the invention where two-way communication is made possible between a vehicle and a fixed point by a light source and a light receiving lens being positioned at the fixed point and on the vehicle.

Referring now to FIG. 4, another embodiment of the invention is illustrated. In this embodiment two-way communication between a vehicle 30 and a fixed position is accomplished by a light 31 and a computer 80 positioned at a fixed position defining a path, the light from light source 31 being received by a light receiving lens 32 carried by vehicle 30 also controlled by a computer 80. Likewise, a light source 34 is carried by vehicle 30 and transmits an optical signal to a lens 35 positioned at the fixed point defining the path. Consequently, information can be transmitted back and forth between the fixed position and vehicle 30, thereby effectuating efficient control of the vehicle.

Figure 5:
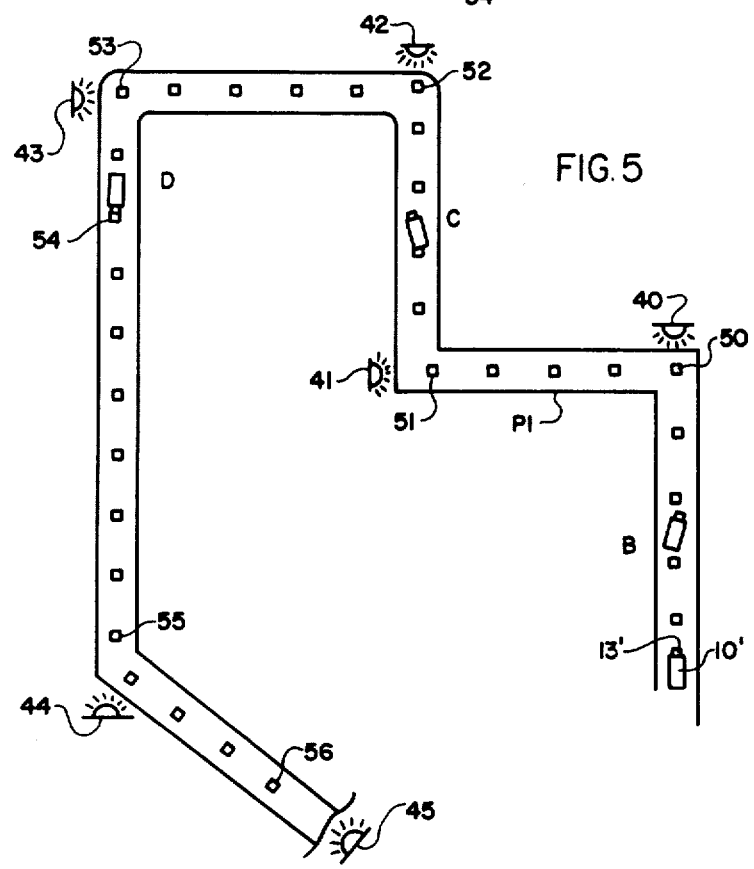
FIG. 5 is a plan view of a hypothetical path defined by a plurality of lights at fixed points wherein distance from the light is determined by means of detector circuits positioned on the path.

Yet another embodiment of the invention is illustrated in FIG. 5. In this embodiment, a path similar to that illustrated in FIG. 2 is shown and is defined by a plurality of lights 40, 41, 42, 43, 44 and 45. Vehicle 10' is guided along path "P'" in the same manner as is illustrated in FIGS. 1 and 2. That is, lens 13' receives an optical signal from light 40 which it converts into a cartesian coordinate which provides information to the vehicle's computer 80 and enables any variation from a straight line path to be corrected. However, instead of also computing an azimuth coordinate to give an indication of distance, speed or acceleration, a plurality of circuits containing information specific to an individual location are embedded in or applied to the path's surface. Several representative circuits are identified on path P' as circuits 50, 51, 52, 53, 54, 55 and 56.

Figure 6A:
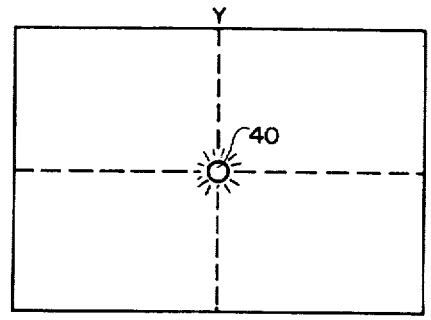
FIGS. 6A-6D illustrate the single coordinate sensed and computed by the lens when the lens determines direction only in the illustration in FIG. 5.
Figure 6B:
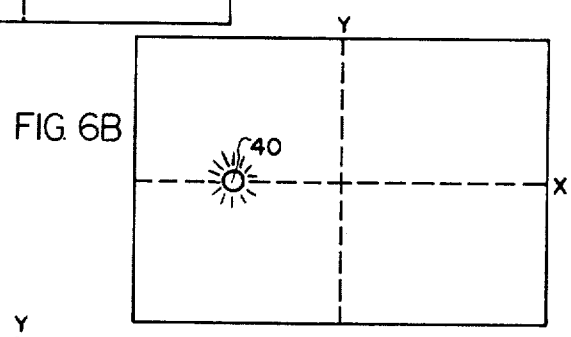
Figure 6C:
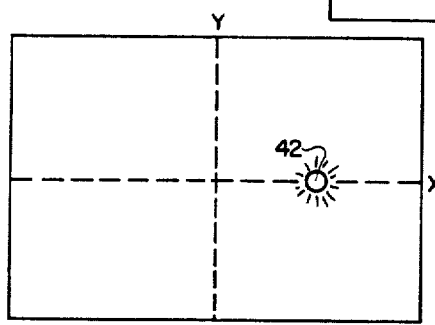
Figure 6D:
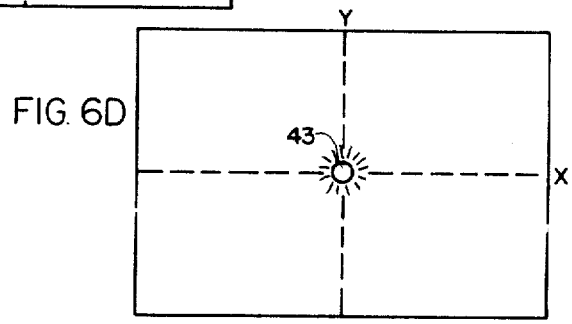

Referring now to FIG. 6A, the diagram represents information conveyed to the lens in the position A in FIG. 5. The vehicle is proceeding directly towards light 40 on the path. However, since no distance information is being computed from the position of light 40, the light is shown centered on the Y axis as well as the X axis. If vehicle 10' at position B veers slightly to the right, the view shown in 6B results. This causes the vehicle to be steered to the left sufficiently to bring it back in alignment with light 40. Likewise, in position C with the vehicle turned slightly to the left, the view shown in 6C causes the vehicle to be steered slightly to the right, again correcting for the steering error.

In position D, vehicle 10' is aligned with light 43 and therefore the light is properly centered at the midpoint of the X axis.

At the same time, distance and other information is provided by the circuits on the path. For example, when vehicle 10' reaches circuit 50, this is sensed by the vehicle's computer and the vehicle is commanded to make a left turn so it continues along the path towards light 41. When vehicle 10' reaches circuit 51 a right turn is commanded. When circuit 52 is reached, a left turn is commanded and when circuit 53 is reached, another left turn is commanded. When vehicle 10' reaches circuit 55, the computer is told that it is a certain distance from light 44. A shallow left turn is commanded and lens 13' begins guiding on light 45. When, in the example shown in FIG. 5, vehicle 10' reaches circuit 56, it is commanded to stop.

The circuits 50 through 56 described above may be of several various types, including electronically programmable microcircuit ships which emit radiation at a predetermined, extremely low power frequency. Depending upon the particular use and duty requirements, the circuit may be powered by an extremely thin wafer-type battery so that the entire circuit and battery component may be easily adhered to a surface with tape and removed and repositioned at will. Also, circuits 50 through 56 may themselves be small LEDs which are controlled by a microcircuit to emit a distinctive bit stream which is detected by a suitable sensor attached to the vehicle 10' as it passes over each invididual circuit. Virtually any type of desired data can be stored in the circuits.

The vehicle guidance system has been described in general above. Now, specific reference will be made to the off-board computer 60 and on-board computer 80 which provide guidance to the vehicle in the manner described above. The position of the off-board computer 60 is not important. In FIG. 1, off-board computer 60 communicates with light 20 as well as any number of other lights which collectively define the path on which the vehicle will travel. The on-board c-mputer is generally designated as reference numeral 80 in FIG. 1. Each vehicle 10 carries an on-board computer 80.

Figure 7:
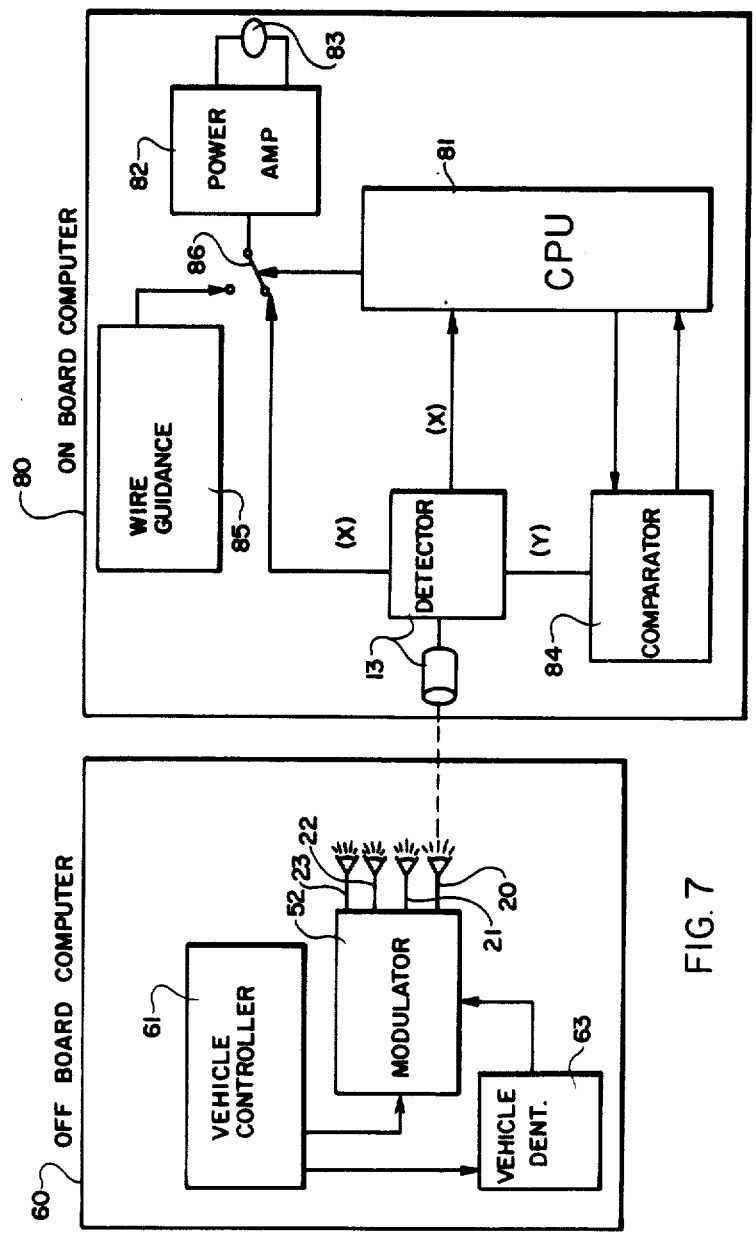
FIG. 7 is a block diagram of the off-board computer and on-board computer of the type used in the system shown in FIGS. 1 and 2; and, FIG. 8 is a block diagram of an off-board computer and on-board computer used on the system illustrated in FIGS. 4 and 5.

The off-board computer 60 comprises a host computer referred to as a vehicle controller 61. Vehicle controller 61 is programmed with all the necessary data so that its memory known where all vehicles are, where all vehicles should be, the assignment for each vehicle, the speed, acceleration and maneuvering requirements for each vehicle and the priority of movement of each vehicle relative to other vehicles and to other factors which determine the necessity of a vehicle being at a certain place at a certain time. Information from vehicle controller 61 is conveyed to a madulator 62 directly and through a vehicle identification circuit 63 where the data is encoded for each vehicle. From the modulator 62, discrete digital bit streams are generated and are segregated to each individual light source. Four of the light sources illustrated in FIG. 1 are also shown in FIG. 7 as LEDs 20, 21, 22 and 23. A bit stream of coded light energy is emitted by LED 20 and is received by lens 13.

Lens 13 includes a detector which, in the embodiment shown in FIG. 1, computes an Y value which measures the angle of the vehicle to LED 20 and thereby computes the position of the vehicle. An X value representing the direction of vehicle 10 is transmitted to a central processing unit 81 which constantly monitors and updates the direction of travel of vehicle 10. The detector 13 also transmits the X data signal to a power amplifier 82 which generates an amplified signal sufficient to output a proper current to a steer motor 83. Depending on the signal transmitted, the steer motor 83 will turn the drive wheels, vary the speed, increase or decrease acceleration, or carry out any other desired maneuver or combination of maneuvers. Y data which contains information concerning the distance of vehicle 10 from light 20 is transmitted from detector 13 to a comparator 84. The Y data is compared with a predetermined value in order to mathematically arrive at the distance of vehicle 10 from LED 20. Information flows between the comparator 84 and the central processing unit 81 as the data is constantly updated and the distance of the vehicle from light 20 constantly calculated.

In one embodiment of the invention, a separate, wire guidance circuit 85 is provided and is connectable to power amplifier 82 through a switch 86. If the path on which vehicle 10 is travelling also contains an embedded wire which can be sensed and followed, switch 86 can be disengaged from lens 13 and the vehicle can be guided along a wire embedded on the path in a conventional manner.

Figure 8:
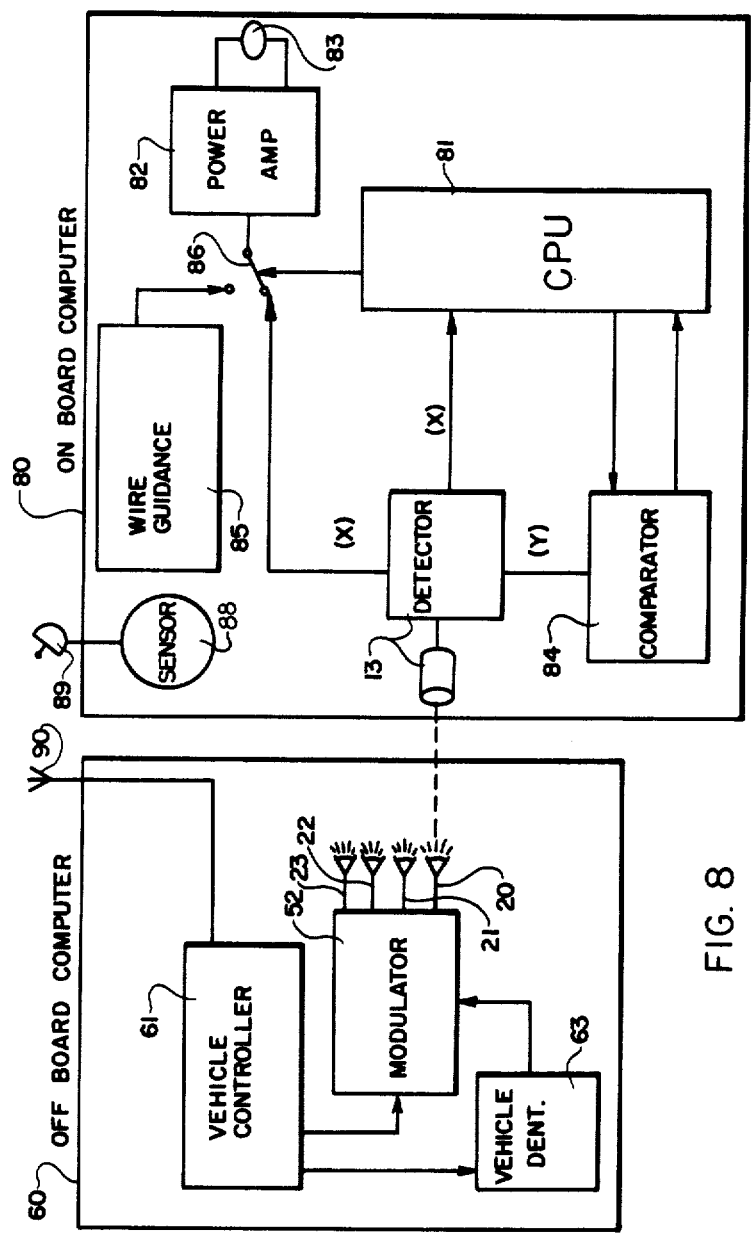

A variation of the system shown in FIG. 7 is illustrated in FIG. 8. As in FIG. 7, means can be provided so that the distance of vehicle 10 from light 20 is computed by the azimuth of LED 20 from lens 13. However, the on-board computer 80' shown in FIG. 8 is also provided with a sensor 88 which is adapted to sense a circuit positioned on the path, such as circuits 50 through 56 shown in FIG. 5. The information thus senses is conveyed by a transmitting antenna 89 to a receiving antenna 90 positioned on off-board computer 60. This information is conveyed to vehicle controller 61 and the vehicle is controlled by feedback through LED 20 to lens 13.

A guided vehicle system which navigates a vehicle by use of a light source and a light receiving lens mounted on the vehicle is described above. Various details of the invention may be changed without departing from the scope of the invention. Furthermore, the foregoing description of the preferred embodiments of the invention are provided for the puspose of illustration only and not for the purpose of limitation—the invention being defined by the claims.

I claim:

1. In a guided vehicle system which includes a vehicle freely maneuverable along a variable, pre-determined path by navigation means and computing the position of said vehicle relative to a plurality of fixed points collectively defining a path, said navigation means comprising:
   (a) an off-board computer having:
      (i) a vehicle controller containing predetermined vehicle and traffic protocol information regarding vehicle speed, direction, priority, routing or scheduling and means for generating an information containing signal;
      (ii) a light source positioned respectively at each of said plurality of fixed points defining said path for receiving the information containing signal from the vehicle controller and emitting a light signal containing such information;
   (b) a computer on-board said vehicle having:
      (i) a light receiving lens for receiving said optical signal from one of said light sources said lens defining a field of view wherein any particular point within the field of view is represented by a X,Y coordinate wherein X,Y represents the displacement of the light source in respect to the axis of the light receiving lens;
      (ii) a central processing unit for receiving and processing all vehicle information and outputting vehicle control instruction signals;
      (iii) a power amplifier for outputting a vehicle control signal to vehicle maneuvering apparatus; and,
      (iv) a detector for segregating X-data and Y-data, outputting Y-data to said central processing unit for azimuth computation and outputting X-data to said central processing unit for vehicle direction computation and to said power amplifier.

2. In a guided vehicle system according to claim 1, wherein said off-board computer comprises a modulator for converting said vehicle controller output signal into an optical, information containing code and sending said optical code serially to said light source.

* * * * *

UNITED STATES PATENT AND TRADEMARK OFFICE
CERTIFICATE OF CORRECTION

PATENT NO. : 4,626,995
DATED : December 2, 1986
INVENTOR(S) : Gunnar K. Lofgren and Goran P.R. Netzler It is certified that error appears in the above-identified patent and that said Letters Patent are hereby corrected as shown below:

Column 5, line 37, correct "sterred" to read --steered--.

Column 6, line 37, correct "ships" to read --chips--.

Column 6, line 58, correct "c-mputer" to read --computer--.

Column 7, line 3, correct "madulator" to read --modulator--.

Figure 7, reference no. "52" should read --62--.

Figure 8, reference no. "52" should read --62--.

Signed and Sealed this

Fourteenth Day of June, 1988

Attest:

DONALD J. QUIGG

*Attesting Officer*      *Commissioner of Patents and Trademarks*